US011955862B2

(12) United States Patent
Bougrassa et al.

(10) Patent No.: US 11,955,862 B2
(45) Date of Patent: Apr. 9, 2024

(54) INTERCONNECTION DEVICE FOR A ROTARY ELECTRIC MACHINE INTENDED FOR A MOTOR VEHICLE

(71) Applicant: Valeo Equipements Electriques Moteur, Creteil (FR)

(72) Inventors: Aziz Bougrassa, Creteil (FR); Omar Bougrassa, Creteil (FR); Laurent Labaste-Mauhe, Creteil (FR); Maxime Pagnard, Creteil (FR); Benjamin Loret, Creteil (FR); Cordula Quitsch, Mondeville (FR); Abdelmalik Hamdani, Le Mesnil Saint Denis (FR); Anthony Brisset, Le Mesnil Saint Denis (FR)

(73) Assignee: Valeo Equipements Electriques Moteur, Creteil (FR)

( * ) Notice: Subject to any disclaimer, the term of this patent is extended or adjusted under 35 U.S.C. 154(b) by 611 days.

(21) Appl. No.: 17/255,127

(22) PCT Filed: Jun. 26, 2019

(86) PCT No.: PCT/FR2019/051583
§ 371 (c)(1),
(2) Date: Dec. 22, 2020

(87) PCT Pub. No.: WO2020/002840
PCT Pub. Date: Jan. 2, 2020

(65) Prior Publication Data
US 2021/0273515 A1    Sep. 2, 2021

(30) Foreign Application Priority Data
Jun. 26, 2018  (FR) .......................... 1855689

(51) Int. Cl.
*H02K 3/52*    (2006.01)
*B60H 1/00*    (2006.01)
*H02K 21/22*    (2006.01)

(52) U.S. Cl.
CPC ......... *H02K 3/522* (2013.01); *B60H 1/00464* (2013.01); *H02K 21/22* (2013.01)

(58) Field of Classification Search
CPC ..... H02K 3/522; H02K 21/22; B60H 1/00464
See application file for complete search history.

(56) References Cited

FOREIGN PATENT DOCUMENTS

| DE | 102008054529 A1 | 6/2010 |
|---|---|---|
| DE | 102012023477 A1 | 5/2014 |

(Continued)

OTHER PUBLICATIONS

WO-2018020168-A1_tranlate (Year: 2018).*

(Continued)

*Primary Examiner* — Tulsidas C Patel
*Assistant Examiner* — Mohammed Ahmed Qureshi
(74) *Attorney, Agent, or Firm* — Osha Bergman Watanabe & Burton LLP

(57) ABSTRACT

An interconnection device for a rotary electric machine provides an electrical connection between a stator and an electronic power-supply and control module. The interconnection device includes an insulating body, connecting members, and a connection terminal. The stator includes coils. The connecting members are arranged on an outer side of the insulating body, and each connecting member includes a body, a connection tongue, and a combined connecting member. The combined connecting member includes a linking lug which electronically connects the coil of the stator to the electronic power-supply and control module. The connection terminal is fixed to the linking lug, and the linking lug is sized to pass through the insulating (Continued)

body, with a free end of the linking lug and a free end of the connection terminal extending from an inner side of the insulating body.

10 Claims, 8 Drawing Sheets

(56) References Cited

FOREIGN PATENT DOCUMENTS

| WO | 2016021803 A1 | 2/2016 | |
|---|---|---|---|
| WO | 2018020168 A1 | 2/2018 | |
| WO | WO-2018020168 A1 * | 2/2018 | ............. H02K 3/522 |

OTHER PUBLICATIONS

International Search Report and Written Opinion in corresponding International Application No. PCT/FR2019/051583, dated Sep. 6, 2019 (13 pages).

* cited by examiner

INTERCONNECTION DEVICE FOR A ROTARY ELECTRIC MACHINE INTENDED FOR A MOTOR VEHICLE

The invention relates to the field of rotary electric machines intended for a motor vehicle. It is favorably, but not exclusively, applied to rotary electric machines operating as a motor for rotating fans of a motor vehicle such as, for example, fans intended to participate in the cooling of an engine and/or in an air-conditioning system of the vehicle.

Such rotary machines include, in particular:
- a stator comprising a polyphase winding;
- an electronic power-supply and control module configured to provide the polyphase power supply to the coils of the stator on the basis of an electric current supplied, for example, by an electrical storage device of the vehicle;
- an interconnection device connected, on the one hand, to the aforementioned electronic power-supply and control module and, on the other hand, to the coils of the stator.

In rotary machines as known from the prior art, the interconnection device comprises, on the one hand, a set of connection elements that are linked, for example by soldering, to metal wires constituting the coils of the stator, and, on the other hand, a set of pins that are connected, for example by soldering, to connection terminals of the electronic power-supply and control module.

It should be understood here that, due to the electronic components that it contains, the electronic power-supply and control module must be protected from water and humidity. It is therefore generally placed in a sealed housing in which are also housed the connection terminals that the electronic power-supply and control module comprises, within which sealed housing are located the connections, for example made by soldering, between these connection terminals and the pins of the interconnection device to which these connection terminals are linked. However, such soldering generates, within the housing for accommodating the interconnection device, mechanical forces which may result in deformation and therefore degradation of the sealtightness of such a housing. In extreme cases, this deformation may result in a complete loss of sealtightness of this housing, and therefore a risk of irreversible damage to the electronic power-supply and control module of the rotary electric machine.

The object of the invention is to overcome this drawback and to provide a simple and efficient interconnection between a stator of a rotary electric machine as mentioned above and an electronic power-supply and control module for this stator, without risk of losing sealtightness with respect to the electronic power-supply and control module.

To this end, the subject of the invention is an interconnection device intended to provide an electrical connection between a stator comprising a plurality of coils and an electronic power-supply and control module, the interconnection device comprising an insulating body and a plurality of connecting members which are arranged on an outer side of the insulating body, each connecting member comprising a body configured to rest on the insulating body and a connection tongue for connecting to at least one coil, characterized in that the plurality of connecting members comprises at least one combined connecting member which further includes a linking lug configured to electrically connect at least one coil of the stator to the electronic power-supply and control module for the stator, said linking lug extending the body by being sized so as to pass through the insulating body and so that the free end of the linking lug extends from an inner side of the insulating body.

The invention also extends to a stator of a rotary electric machine of a motor vehicle, configured to be linked to an electronic power-supply and control module by means of such an interconnection device according to the invention.

It should first of all be understood here that within a rotary electric machine according to one aspect of the invention, the stator, its electronic power-supply and control module, and the interconnection device between these two assemblies are arranged in a stack in which the interconnection device according to the invention is placed between the stator and the electronic control module thereof. This thus defines a first side of the interconnection device according to the invention located on the stator side, and a second side of the interconnection device according to the invention located on the side of the power-supply and control module for the stator. In the interconnection device according to the invention, this first side and this second side are more precisely each located on one side of an insulating body that the interconnection device includes, the term "side" being understood here with respect to a main extension face of such an insulating body. Arbitrarily, the aforementioned second side will be referred to in what follows as the outer side of the insulating body, and the aforementioned first side will be referred to in what follows as the inner side of the insulating body of the interconnection device according to the invention.

Advantageously, each connecting member of the interconnection device according to the invention comprises a substantially planar body from which extends a connection tongue for connecting to at least one coil of the stator. The connecting members of the interconnection device according to the invention thus couple the phases of the wound stator. For example, in the case of a three-phase stator, each connecting member is connected to two coils of the stator, each of which is connected to a different phase thereof.

According to one feature of the invention, the combined connecting member is configured such that the linking lug extends an edge of the body perpendicular to the edge bearing the connection tongue. More precisely, the invention makes provision for the linking lug of the combined connecting member to pass all the way through the insulating body, that is to say from one side to the other thereof, such that it comes out, with respect to the aforementioned insulating body, on the side thereof opposite the side from which the plane formed by the bodies of the connecting members extends.

In the interconnection device according to the invention, the connecting members are advantageously arranged such that their bodies are arranged together substantially in the same plane, to within manufacturing and assembly tolerances. In other words, the planes along which the bodies of the connecting members extend together form a plane of the interconnection device according to the invention. More precisely, the plane defined by the bodies of the connecting members is located on the outer side, defined above, of the insulating body of the interconnection device according to the invention, that is to say on the side of the electronic power-supply and control module with respect to the aforementioned insulating body.

In the interconnection device according to the invention, the connection tongue of a connecting member extends out of the plane in which the body of the connecting member extends, and the connection tongues are all located on the same side of the plane that the bodies of the connecting members together define, while the free ends of the securing lugs are arranged on the opposite side of this plane with respect to the connection tongues. In other words, the connection tongues all extend on the same side of the device according to the invention with respect to the insulating body, defined above, thereof. More precisely, in a rotary electric machine of the type described above, implementing an interconnection device according to the invention, the connection tongues of the connecting members all extend, with respect to the aforementioned insulating body, on the side of the electronic power-supply and control module for the stator of the rotary electric machine.

According to the invention, the linking lug of the combined connecting member is configured to cooperate, for example by soldering, with a connection terminal from the power-supply and control module defined above and passing through the insulating body of the interconnection device according to the invention. More precisely, in a rotary electric machine implementing an interconnection device according to the invention, the aforementioned linking lug and connection terminal are accommodated together in a through-opening arranged in the insulating body of the interconnection device defined above, and they are electrically linked to one another on the side of this insulating body opposite the side of the insulating body on which the plane defined by the bodies of the connecting members defined above is located. In other words, the invention makes provision for the connection between the connection terminal from the power-supply and control module and the linking lug to be made opposite the electronic power-supply and control module with respect to the insulating body of the interconnection device, that is to say outside of a sealed housing in which, as indicated above, the electronic power-supply and control module is advantageously accommodated. The invention thus makes it possible to eliminate the risk of deformation, mentioned above, of such a sealed housing which could result from making the solder joints between the linking lug of the combined connecting member and the connection terminal from the electronic power-supply and control module. The invention makes it possible to facilitate the soldering of the two sub-assemblies formed by the stator and the electronic module when the stator is placed on the module forming the machine frame, this soldering being performed on two free ends of tongues and terminals that are respectively turned away from the frame formed by the electronic module.

It follows from the above that, in a rotary electric machine implementing an interconnection device according to the invention, the combined connecting member, defined above, is, by means of the connection tongue that it bears, linked to at least one coil of the stator and, by means of the linking lug that it comprises, linked to the electronic power-supply and control module for the stator. The combined connecting member therefore forms the electrical link between the stator and the power-supply and control module for same. It also follows from the above that a first category of connecting members may be distinguished, referred to in what follows as simple connecting members, which comprise a linking tongue and which form the only connection of the interconnection device according to the invention to the coils of the stator, and a second category of connecting members, consisting of the one or more combined connecting members as defined above, which include, in addition to a connection tongue as mentioned above, a linking lug as defined above, and which form the connection of the interconnection device according to the invention both to the coils of the stator and to the connection terminals from the electronic power-supply and control module for the stator. In what follows, the generic term of connecting member will refer to any of the connecting members of either of the aforementioned categories.

Advantageously, the invention may have one or more of the following features, taken individually or in combination:
the insulating body forms recesses for accommodating electrical coupling tracks for the coils, each coupling track forming a support for a group of connecting members, and each group of connecting members comprises at least one combined connecting member. In other words, the interconnection device according to the invention comprises the same number of combined connecting members and coupling tracks, that is to say the same as the number of stator phases.
the linking lug of a combined connecting member is arranged laterally with respect to a body of this combined connecting member. As mentioned above, a simple or combined connecting member comprises a substantially planar body from which extends a connection tongue, and, for a combined connecting member, in addition to the aforementioned connection tongue, a linking lug. Advantageously, the body of a simple or combined connecting member is substantially rectangular in shape, the connection tongue that it comprises extending from one of the short sides of the rectangle formed by the body of the connecting member, and the body of the connecting member being linked to a coupling track as defined above by its short side opposite the short side from which the connection tongue extends. It should then be understood from the above that the linking lug of a combined connecting member advantageously extends from one of the long sides of the rectangle formed by the body of the combined connecting member in question. According to one particularly advantageous embodiment, the insulating body of the interconnection device according to the invention is substantially cylindrical in shape, around the axis of which are arranged, substantially concentrically, recesses that are configured to accommodate, in a rotary electric machine according to the invention, the coupling tracks for the stator coils. According to this exemplary embodiment, the connecting members are advantageously arranged around the axis of the insulating body of the interconnection device, such that the long sides of their bodies extend substantially, to within manufacturing and assembly tolerances, in radial directions with respect to the axis of this insulating body. According to this exemplary embodiment, the short sides of the bodies of the connecting members from which the connection tongues extend advantageously form perimeter portions of a ring centered on the axis of the insulating body, that is to say, in other words, that the connection tongues defined above are advantageously arranged at an equal distance from the axis of the aforementioned insulating body.
the coupling tracks are configured such that for one coupling track, a combined connecting member is arranged with at least one other connecting member on each side of this combined connecting member, and in one coupling track, the linking lug of the combined connecting member is laterally arranged on a first side of the body of this combined connecting member while in at least one other coupling track, the linking lug of the combined connecting member is laterally arranged on a second side of the body of this combined connecting member. The main purpose of such a configuration is to obtain keying in the installation of the combined connecting members in the interconnection device according to the invention and, within a rotary electric machine implementing such an interconnection device, with respect to the coupling tracks for the stator and with respect to the connection terminals from the electronic power-supply and control module for this stator.

the insulating body of the interconnection device according to the invention comprises a first group of accommodating housings that are configured to accommodate a simple connecting member, and a second group of accommodating housings, which pass through the aforementioned insulating body from one side to the other, that are configured to accommodate, in a rotary electric machine according to the invention, a combined connecting member and a connection terminal from the electronic power-supply and control module for the stator. More precisely, the accommodating housings are distributed in a first group of accommodating housings sized to accommodate simple connecting members without a securing lug and in a second group of housings each comprising a first portion, the dimensions of which are substantially identical to those of an accommodating housing of the first group of accommodating housings, and a second portion that laterally enlarges the first portion and is configured to simultaneously accommodate the linking lug of a combined connecting member and a connection terminal of the electronic power-supply and control module.

the connecting members are advantageously angularly regularly distributed around the axis of the insulating body of the interconnection device.

since the interconnection device according to the invention is intended to be connected to a stator comprising three electrical phases, the interconnection device comprises three groups of connecting members, each of which comprises two simple connecting members, as defined above, and one combined connecting member as described above. Advantageously, since the connecting members of each group of connecting members are angularly regularly distributed around an axis of the insulating body of the interconnection device according to the invention, the angle, measured around this axis, separating the combined connecting member of the first group of connecting members and the combined connecting member of the second group of connecting members is different from the angle separating the combined connecting member of the second group of connecting members and the combined connecting member of the third group of connecting members. In other words, such a configuration makes it possible to achieve angular keying in the assembly of the interconnection device according to the invention with the electronic power-supply and control module for the stator.

The invention also extends to a rotary electric machine comprising a wound stator, an electronic power-supply and control module and an interconnection device as described above.

According to one feature of the invention, the interconnection device is arranged between the stator and the electronic power-supply and control module, each combined connecting member being configured so that the securing tongue extends between the interconnection device and the electronic power-supply module to be connected to a coil of the stator and so that the securing lug passes through the insulating body of the interconnection device so that its free end is arranged opposite the electronic power-supply and control module with respect to the insulating body, said free end being fixed to the free end of a connection terminal from the electronic power-supply and control module and passing through the insulating body of the interconnection device.

Such a rotary electric machine may in particular be associated with a cooling motor-fan unit in a motor vehicle, whether this is for cooling the combustion powertrain of this vehicle or for ventilating the passenger compartment.

Other features, details and advantages of the invention will become more clearly apparent with the aid of the following description and of the drawings, of which:

Figure 4:
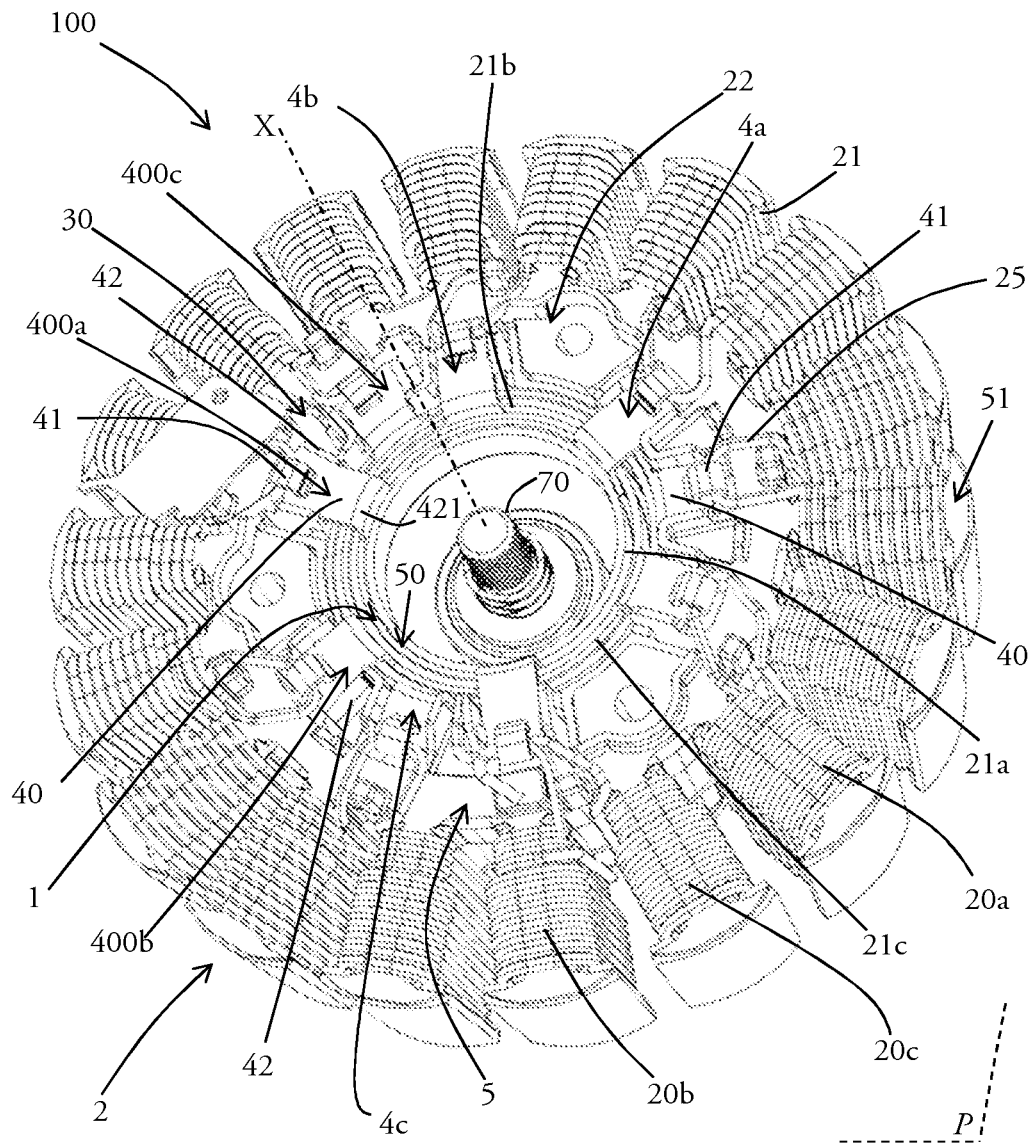
FIG. 4 is a schematic view of a portion of a rotary electric machine according to the invention such as that illustrated by FIGS. 1 and 2, showing in particular the stator of this rotary electric machine and the interconnection device covering this stator.
Figure 9:
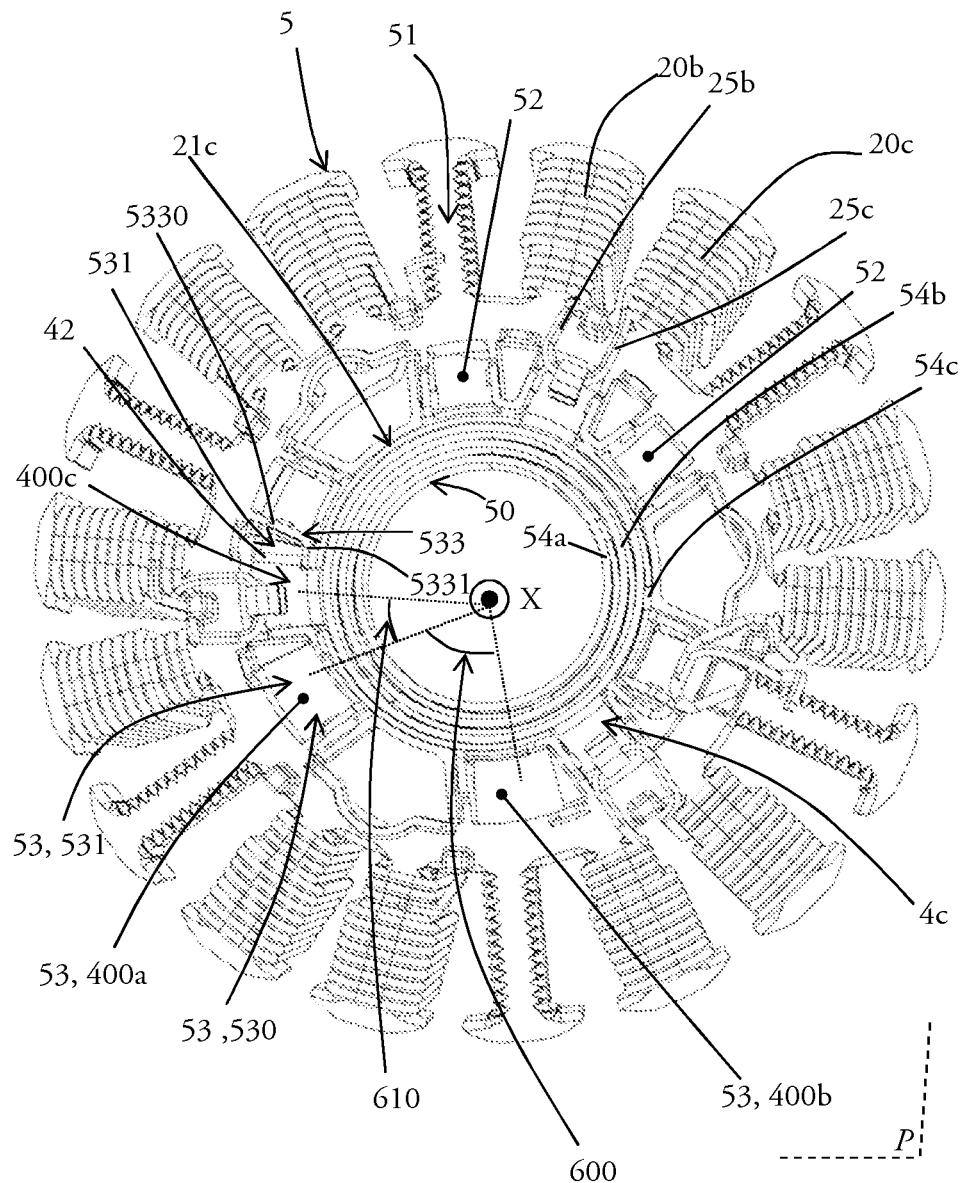

and FIG. 9 is a schematic perspective view of the insulating body and a portion of the connecting members of an interconnection device according to one aspect of the invention, from a viewing angle similar to that of FIG. 4.

It should first of all be noted that although the FIGS. set out the invention in detail for implementing the invention, said FIGS. may of course be used in order better to define the invention if necessary. It should also be noted that, in all of the figures, elements which are similar and/or perform the same function are indicated by the same reference.

Figure 1:
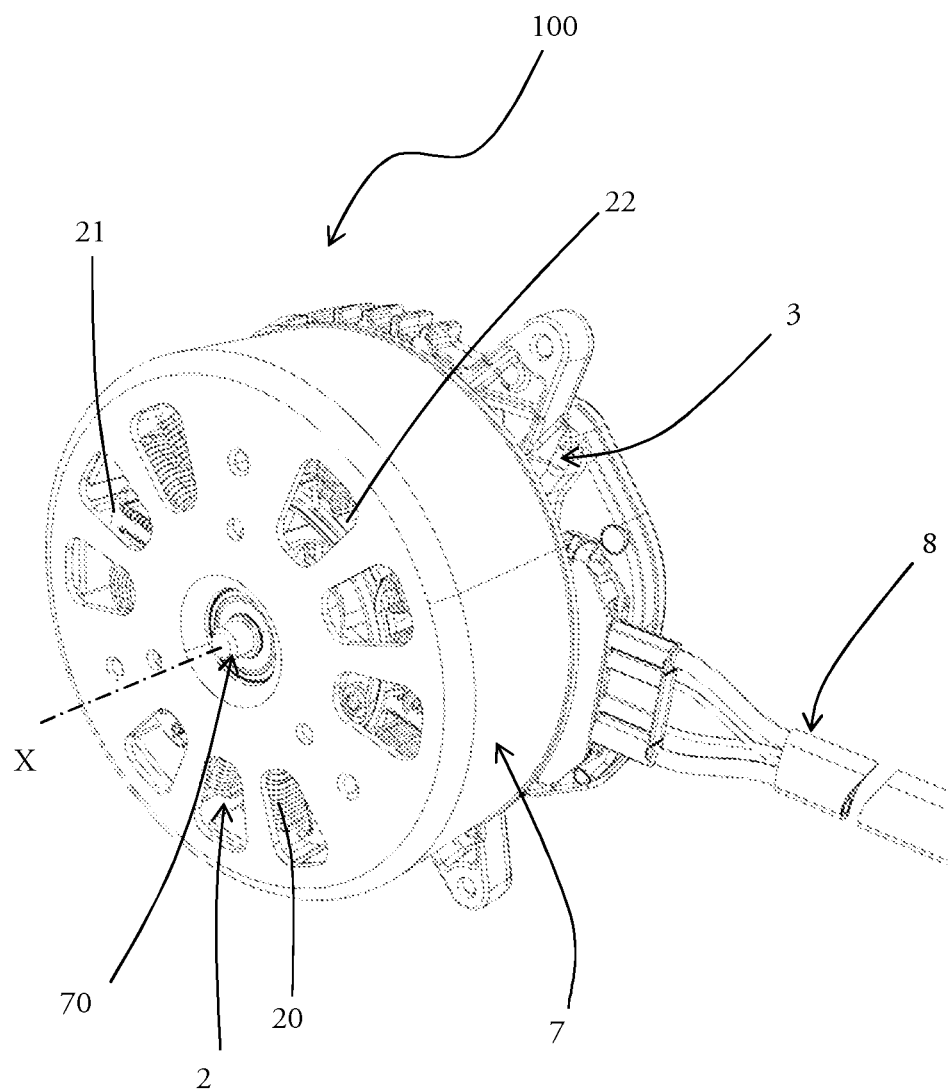
FIG. 1 and FIG. 2 are general schematic perspective views of a rotary electric machine according to one aspect of the invention, FIG. 2 showing in particular a stator and an electronic power-supply and control module.
Figure 2:
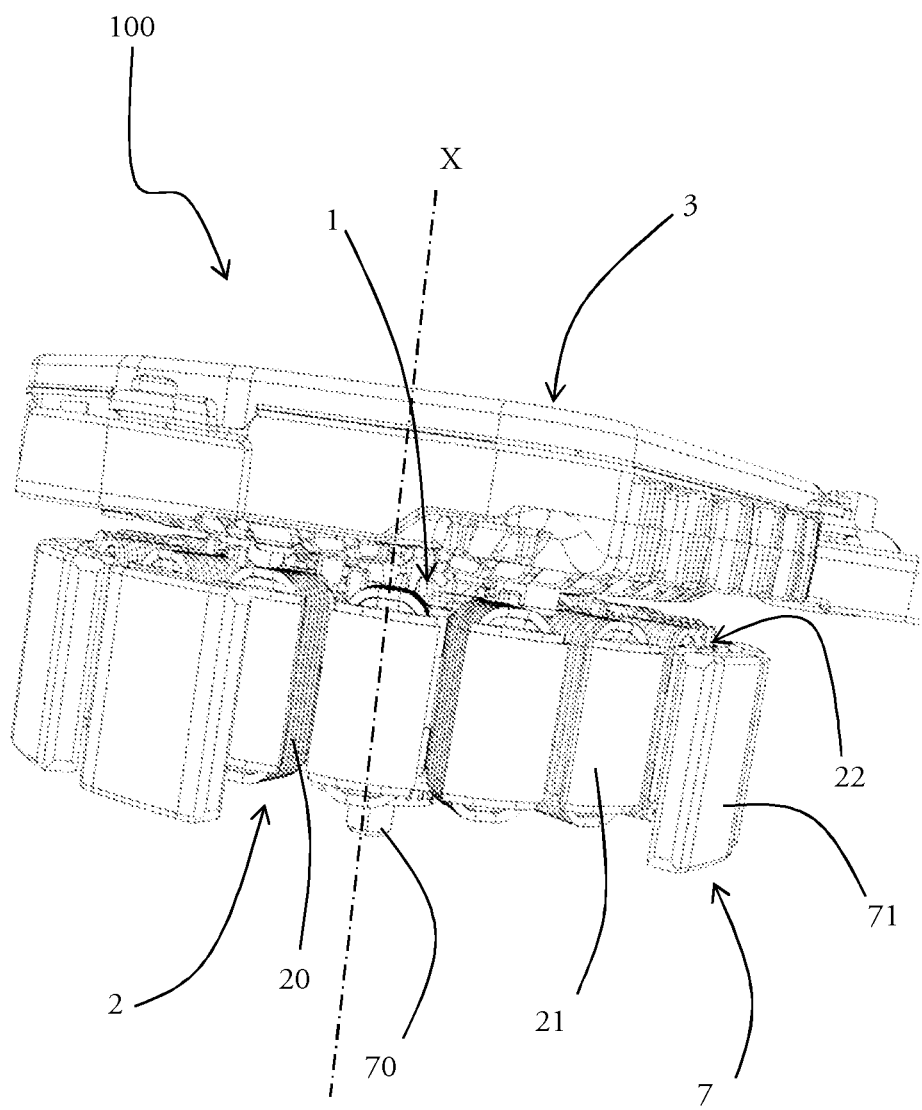

With reference to FIGS. 1 and 2, a rotary electric machine 100 according to the invention, intended, for example, to operate as a motor for rotating fans of a motor vehicle, comprises in particular a rotor 7, the general shape of which is that of a substantially cylindrical dome. The rotor 7 is mounted so as to rotate, by means of ball bearings, about a shaft 70 whose axis X is the axis of the aforementioned substantially cylindrical dome. The rotor 7 advantageously bears, on its inner periphery, that is to say on the inner face of the peripheral wall of the dome, a plurality of permanent magnets 71, which are partially visible in FIG. 2, forming the magnetic poles of the rotary electric machine wo. In a motor vehicle equipped with such a rotary electric machine wo, an impeller, not shown in the figures, of a vehicle fan may be accommodated by the dome which is capable of being rotated.

The rotary electric machine wo also comprises a stator 2 mounted so that it is fixed relative to the vehicle structure to which the rotary electric machine is fitted, and placed in the substantially cylindrical volume defined by the dome formed by the rotor 7 which thus rotates about the stator. Advantageously, the stator 2 is generally substantially cylindrical in shape, and it is coaxial with the rotor 7, that is to say with the axis of rotation X defined above. The stator 2 comprises a plurality of coils 20, for example produced by winding one or more metal wires around teeth 21 of a body 22 of the stator 2.

The rotary electric machine 100 also comprises an electronic power-supply and control module 3 for the winding of the stator 2. This electronic power-supply and control module acts as a machine frame and the stator 2 is mounted to this module in a fixed manner, as is the shaft 70 about which the rotor 70 can rotate. The electronic power-supply and control module 3 is advantageously supplied with electric current by means 8 originating, for example, from an electrical power-supply device of the vehicle, not shown in FIG. 1.

Figure 3A:
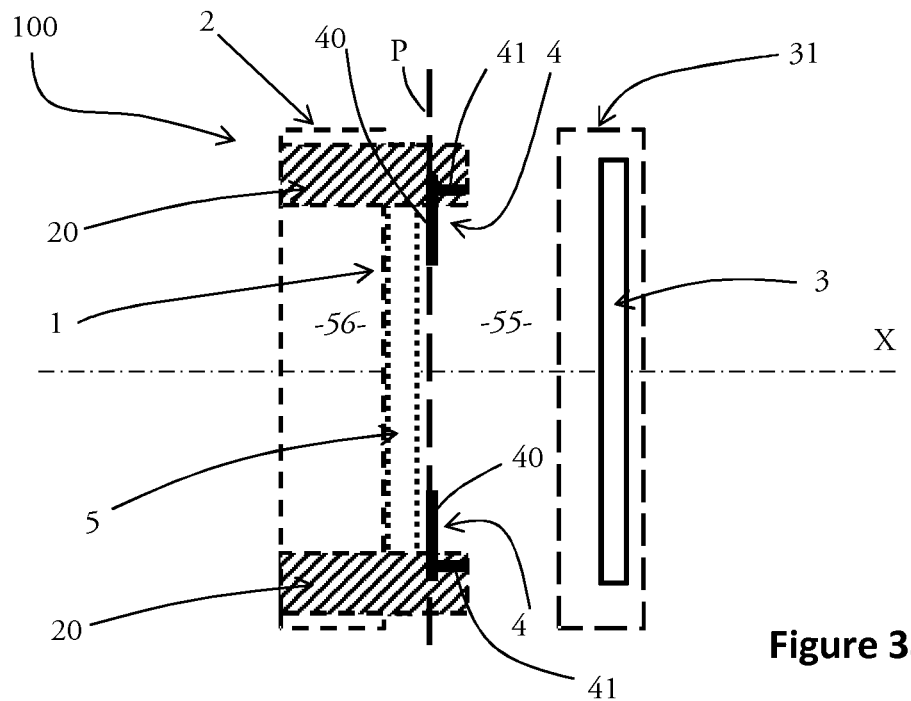
FIGS. 3a and 3b are schematic diagrams, in cross section, of an interconnection device according to one aspect of the invention.
Figure 3B:
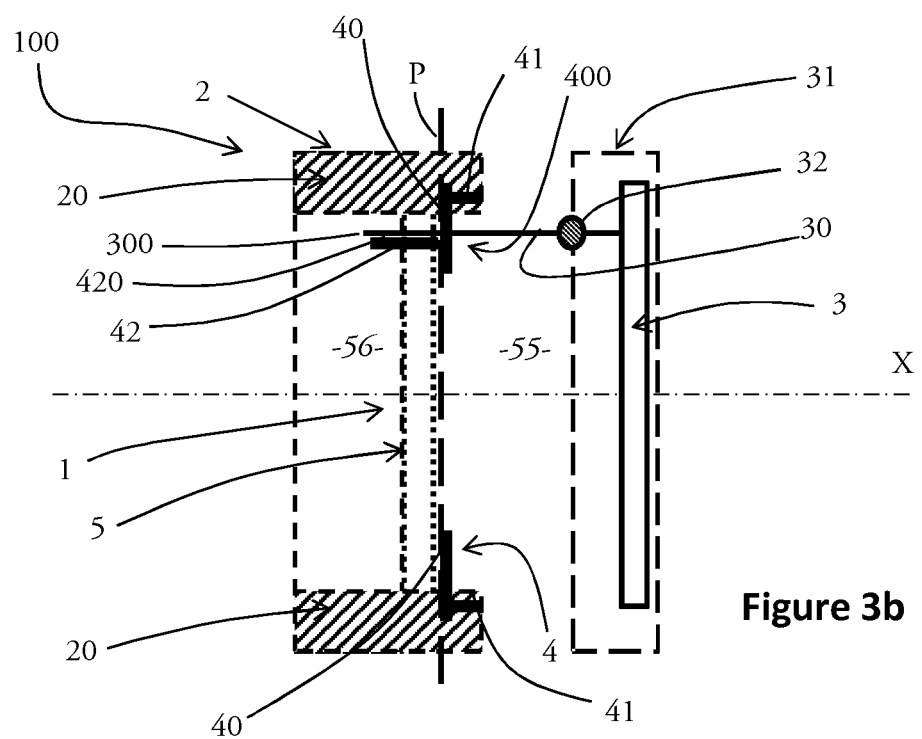

According to the invention, the stator 2 and the electronic power-supply and control module 3 are electrically linked to one another by an interconnection device 1, the operating principle and the main components of which are schematically shown in FIGS. 3a and 3b. The interconnection device 1 is partially visible in FIG. 2.

In what follows, the invention will be described and illustrated in the context of the exemplary embodiment illustrated by FIGS. 1 and 2.

FIGS. 3a and 3b are diagrams that illustrate schematically, along different sectional planes containing the axis of rotation X defined above, the stack formed, in a rotary electric machine 100 such as that illustrated by FIGS. 1 and 2, by the stator 2, the interconnection device 1 according to the invention and the electronic power-supply and control module 3.

The interconnection device 1 comprises an insulating body 5 to which one or more connecting members 4 are attached.

According to the exemplary embodiment of the invention described and illustrated here, non-exclusively, the insulating body 5 is generally substantially cylindrical in shape, coaxial with the axis X defined above. By extension, this axis X will also be referred to as the axis of the interconnection device 1 in what follows. As shown in FIGS. 3a and 3b, the interconnection device 1, the stator 2 and the electronic power-supply and control module 3 are arranged together in a stack in which the interconnection device 1 and, more particularly, its insulating body 5 is placed between the electronic power-supply and control module 3 and the stator 2. Advantageously, the insulating body 5 of the interconnection device 1 according to the invention extends over a radial dimension, around the aforementioned axis X, that is substantially equal to an inner radial dimension of the stator 2.

With reference to FIG. 3a, the interconnection device 1 comprises a plurality of connecting members 4, each of which comprises a connection tongue 41 configured to be electrically connected to at least one coil 20 of the stator 2. In the diagram illustrated by FIG. 3a, two connecting members 4 are shown, and each of them is connected to a coil 20 of the stator 2. The connecting member 4 more precisely comprises a body 40 which is substantially planar and perpendicular, to within manufacturing and assembly tolerances, to the axis X of the insulating body 5 of the interconnection device 1, the connection tongue 41 extending substantially perpendicularly from the body 40 of the connecting member 4, toward the electronic power-supply and control module 3.

As shown in FIG. 3a, in the interconnection device 1 according to the invention, the bodies 40 of the connecting members 4 are substantially arranged together in a plane P, substantially perpendicular to the axis X of the aforementioned insulating body 5, on the same side, in the direction of the aforementioned axis X, of the insulating body 5. The concept of "side" is defined here with regard to the generally substantially cylindrical shape of the insulating body 5, with respect to the faces of this general shape that are perpendicular to the axis X thereof. More precisely, the bodies 40 of the connecting members 4 together define a plane P located on the same side of the insulating body 5 as the electronic power-supply and control module 3, in the direction of the axis X of the insulating body 5. In what follows, this side of the insulating body 5 will be arbitrarily referred to as the outer side 55 of the insulating body 5. Consequently, in what follows, the term inner side 56 of the insulating body 5 will be used to refer to the side that is opposite, in the direction of the axis X of the insulating body 5, to the aforementioned outer side 55, with respect to the insulating body 5.

According to the invention, and as shown more particularly by the sectional plane of FIG. 3b, the interconnection device 1 comprises at least one combined connecting member 400 which includes, in addition to a body 40 and a connection tongue 41 defined above, a linking lug 42 which extends from the body 40 in a direction opposite that of the connection tongue 41. The linking lug 42 is configured to pass through the insulating body 5, substantially perpendicular to the body 40 of the combined connecting member 400. In other words, the linking lug 42 of the combined connecting member 400 passes through the insulating body 5 from the outer side 55 to the inner side 56, defined above, thereof.

According to the invention, and as shown more particularly in FIG. 3b, the linking lug 42 of the combined connecting member 400 is configured to cooperate, after having passed through the insulating body 5 from one side to the other, with a connection terminal 30 from the electronic power-supply and control module 3 defined above. For example, the aforementioned linking lug 42 may be soldered to the aforementioned connection terminal 30. However, it follows from the above that the link between the linking lug 42 and the connection terminal 30 is made on the inner side of the insulating body 5, that is to say opposite the electronic power-supply and control module with respect to the interconnection device 1, such that both the linking lug 42 and the connection terminal must, according to the invention, pass through the insulating body 5 so that their respective free ends 420 extend on the inner side 56 of the insulating body 5.

It follows from the above that the combined connecting member 400, electrically linked, by the connection tongue 41 that it comprises, to one or more coils 20 of the stator 2, is also electrically linked to the electronic power-supply and control module 3 by means of the linking lug 42 that it comprises: the combined connecting member 400 therefore makes the electrical link between the stator 2 and the electronic power-supply and control module 3.

As mentioned above, the electronic power-supply and control module 3 must be protected from water and humidity: it is therefore preferably accommodated in a housing 31 equipped, for example, with seals 32 that are configured to ensure the sealtightness of the housing 31 with regard to ambient humidity and water. It then follows from the above that, by virtue of the particular configuration of the combined connecting member 400, no electrical link between the stator 2 and its electronic power-supply and control module 3 is made within the housing 31 in which the electronic power-supply and control module 3 is housed. More precisely, the electrical link between the stator 2 and a connection terminal 30 from the electronic power-supply and control module 3 is made opposite the latter with respect to the insulating body 5 of the interconnection device 1, in the direction of the axis X of the latter. In other words, with reference to the orientations and directions defined above, in a rotary electric machine 100 according to the invention, the electrical link between the connecting members 4, 400, of the interconnection device 1 according to the invention and the coils 20 of the stator 2 is made on the outer side 55 of the insulating body 5, and the electrical connection between the one or more combined connecting members 400 and the electronic power-supply and control module 3 for the stator 2 is made on the inner side 56 of the insulating body 5.

The invention therefore makes it possible to prevent the occurrence, within the aforementioned housing 31, of any mechanical deformation resulting from the formation, for example by soldering, of the electrical link between the stator 2 and the electronic power-supply and control module 3, which mechanical deformation may result in degradation of the sealtightness of the aforementioned housing 31. The invention thus indeed achieves one of its set aims.

FIG. 4 is a schematic perspective view of a portion of a rotary electric machine 100 as illustrated by FIGS. 1 and 2. FIG. 4 shows, from the outer side 55, defined above, of the insulating body 5 of the interconnection device 1, the stator 2, a portion of the rotary shaft 70 about which the rotor 7 can rotate, as well as elements of the interconnection device 1, and it also schematically shows a connection terminal 30, which is also visible in FIG. 8, from the electronic power-supply and control module 3, not shown here, in order to illustrate the passage of this connection terminal through the interconnection device and its insulating body.

According to the exemplary embodiment illustrated by FIG. 4, the stator 2 comprises eighteen coils 20, each formed of one or more metal wires wound around a tooth 21 of a body 22 of the stator 2. Since the aforementioned teeth 21 are arranged in radial directions around the aforementioned axis X, the coils 20 of the stator 2 extend in substantially radial directions around this axis. According to this exemplary embodiment, the wound stator 2 is a three-phase stator, and the coils 20 are organized in three groups of coils, respectively 20a, 20b, 20C, forming the different phases. Of course, the fact that the winding is a three-phase winding is here a non-limiting example and the invention may be applied for polyphase windings with another number of phases.

FIG. 4 also partially shows the rotary shaft 70, the direction of which marks the direction of the axis X common to the rotor 7, to the stator 2 and to the interconnection device 1.

Figure 6:
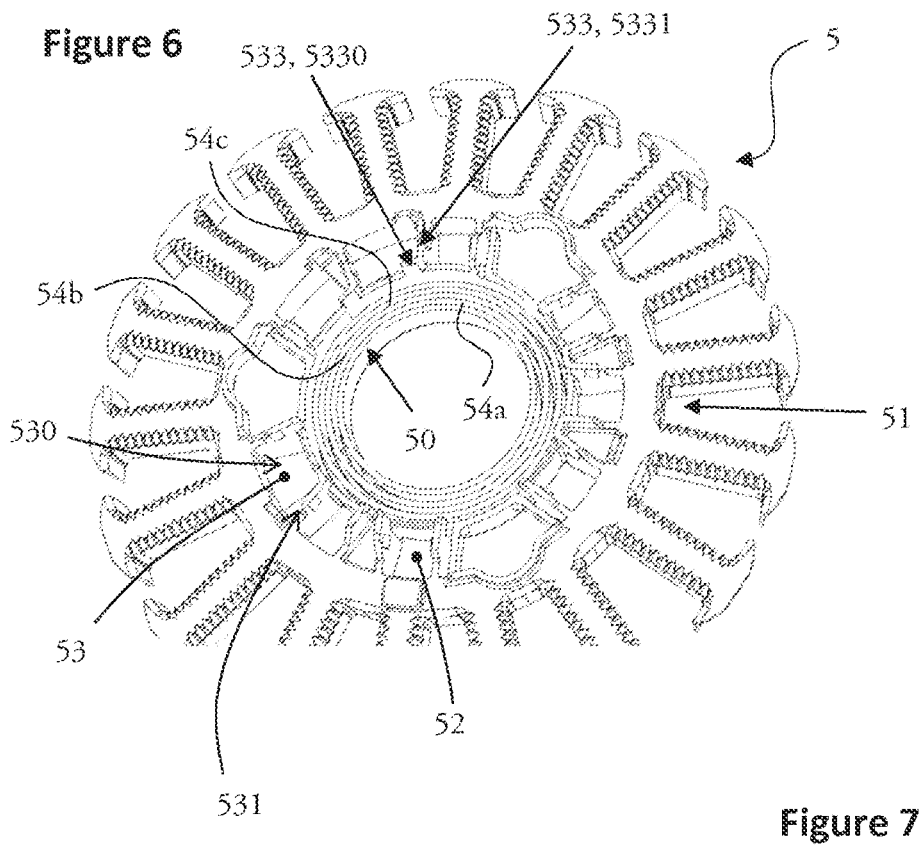
FIGS. 6 and 7 are perspective views showing individually, respectively, an insulating body of the interconnection device of FIG. 4 and a coupling track bearing a group of connecting members.

With reference to FIGS. 4, 6 and 9 in particular, the interconnection device 1 comprises an insulating body 5, the general shape of which is substantially that of a cylinder, the axis of which is coincident, to within manufacturing and assembly tolerances, with the axis X of the interconnection device 1. The insulating body 5 extends along a radial dimension, measured with respect to the aforementioned axis X, that is substantially equal to the radial dimension of the body 22 of the stator 2. More precisely, the insulating body 5 extends so as to partially cover the stator, on the side of the stator 2 on which the electronic power-supply and control module 3 is located, not shown in FIG. 4. More particularly, the insulating body 5 comprises a central portion 50 configured to be inserted substantially into a central portion 220, visible in FIG. 8, of the body 22 of the stator 2 with which it is coaxial, and a peripheral portion 51 which comes substantially into contact with the teeth 21 of the aforementioned body 22.

To achieve the coupling of the different groups of coils 2oa, 20b, 20c, the interconnection device 1 comprises in particular, in the central portion 50, a first coupling track 21a, a second coupling track 21b, and a third coupling track 21c. According to the embodiment more particularly illustrated by FIG. 3, the coupling tracks 21a, 21b, 21c are concentric, and they each extend over a portion of the perimeter of a ring centered on the axis X of the interconnection device 1. The coupling tracks 21a, 21b, 21c are advantageously made of an electrically conductive material, for example a metal material.

As specified above, the interconnection device 1 also comprises a plurality of connecting members 4, and it is particularly visible in FIG. 4 that each of these connecting members is attached to one of the coupling tracks 21a, 21b, 21c. Thus, it is possible to distinguish a first group of connecting members 4a, attached to the first coupling track 21a, a second group of connecting members 4b, attached to the second coupling track 21b, and a third group of connecting members 4c, attached to the third coupling track 21c. According to the exemplary embodiment more particularly illustrated by FIG. 4, each group of connecting members 4a, 4b, 4c comprises three connecting members. According to this particular embodiment, within each group of connecting members, the connecting members 4a, 4b, 4c are angularly regularly distributed around the axis X of the interconnection device 1 according to the invention, but the groups of connecting members 4a, 4b, 4c are not regularly distributed angularly around the aforementioned axis X. Advantageously, the connecting members are made of the same material as the coupling tracks 21a, 21b, 21c, that is to say of an electrically conductive material, for example a metal material.

Each connecting member 4a, 4b, 4c includes in particular a body 40, which is substantially planar, a connection tongue 41 which extends from the aforementioned body 40, to a radial end thereof, and a coupling lug 421 that is configured to be housed in one of the coupling tracks 21a, 21b, 21c mentioned above. More precisely, with reference to FIG. 4, the body 40 of the connecting members 4a, 4b, 4c is generally substantially rectangular and planar in shape, the long sides of which extend in directions that are substantially radial with respect to the axis X of the interconnection device 1. In other words, the bodies 40 of the connecting members 4a, 4b, 4c are arranged substantially in a star, that is to say in radial directions, around the axis X of the interconnection device 1.

As specified above, the bodies 40 of the connecting members 4a, 4b, 4c are all arranged in the same plane P that is substantially perpendicular to the axis X of the interconnection device 1. The plane P is schematically shown in FIG. 4, and it should be understood that it extends from the outer side of the insulating body 5 visible in FIG. 4, that is to say the same side of the insulating body 5 as the electronic power-supply and control module 3.

Figure 7:
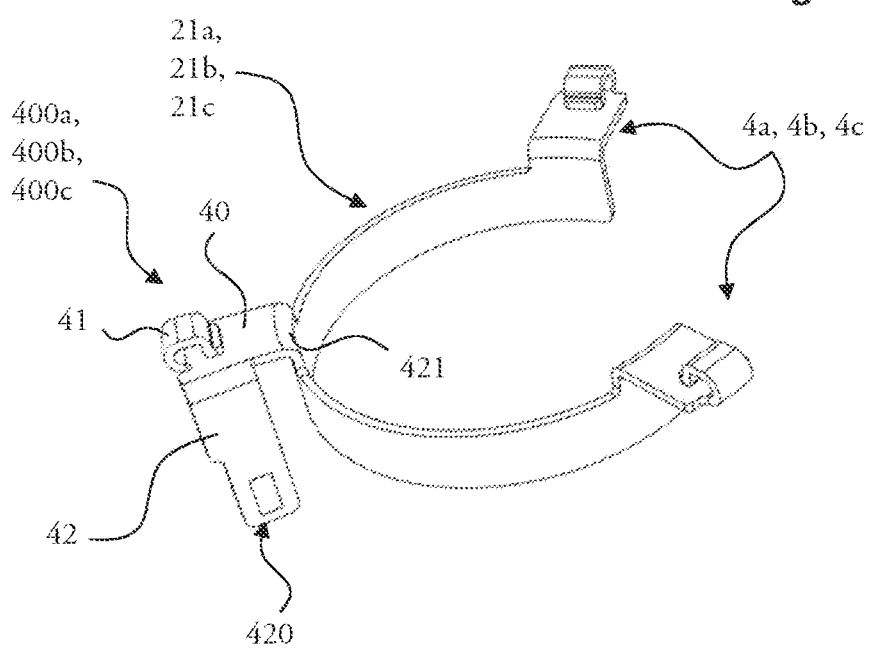

As shown for example in FIG. 4 or 7, and as indicated above, the connection tongues 41 all extend on the same side of this aforementioned plane P, that is to say on the same side of the insulating body 5 of the interconnection device 1. With reference to the above, the connection tongues 41 extend on the same side of the aforementioned plane P as the electronic power-supply and control module 3, that is to say on the outer side 55 of the insulating body 5.

According to the exemplary embodiment more particularly illustrated, the connection tongues 41 extend from a short side of the substantially rectangular shape of the body 40 of the connecting members 4a, 4b, 4c. More precisely, the connection tongues 41 extend from the short side of the bodies 40 opposite the short side of the bodies 40 closest to the axis X defined above. As shown in FIG. 4, the connection tongues 41 are respectively folded back on themselves so as to form, with the body 40 of the corresponding connecting member 4a, 4b, 4c, a ring configured to accommodate one or more metal wires 25 from one or more coils 20a, 20b, 20c of the stator 2, thus participating in an electrical connection between the connecting member 4a, 4b, 4c and the coils 20a, 20b, 20c in question, these electrical connections being able to be made by soldering or crimping.

More precisely, according to the exemplary embodiment more particularly illustrated by FIG. 4, each connection tongue 41 is connected to two coils belonging to two distinct groups of coils 20a, 20b, 20c. The connection tongues 41 thus provide continuity of electrical connection for the phases of the stator 2 to one other while the coupling lugs 421 provide, via the coupling tracks 21a, 21b, 21c, continuity of electrical connection for the connecting members associated with one and the same phase.

As defined above, the interconnection device 1 according to the invention comprises at least one connecting member, referred to as a combined connecting member, which comprises, in addition to a body 40 and a connection tongue 41 defined above, a linking lug 42. According to the example more particularly illustrated by FIG. 4, each group of connecting members 4a, 4b, 4c comprises a combined connecting member, respectively 400a, 400b, 400c. In what follows, the term simple connecting members will be used to refer to the connecting members 4a, 4b, 4c which are not combined connecting members, that is to say those which do not have a linking lug 42, and the generic term of connecting members will be applied to all types of connecting members, whether simple or combined.

Like for the simple connecting members 4a, 4b, 4c, the combined connecting members 400a, 400b, 400c comprise a body 4o and a connection tongue 41, which are identical, respectively, to the body 40 and to the connection tongues 41 of the simple connecting members 4a, 4b, 4c. In addition, in an identical manner to the connection tongues 41 of the simple connecting members 4a, 4b, 4c, the connection tongues 41 of the combined connecting members 400a, 400b, 400c are each electrically connected to two coils of the groups of coils 2oa, 20b, 20C of the stator 2.

The linking lug 42 of each combined connecting member 400a, 400b, 400c extends from a long side of the substantially rectangular body 40 of the combined connecting member 400a, 400b, 400c in question, substantially perpendicular to the body 40 and opposite the connection tongue 41 of the combined connecting member 400a, 400b, 400c when considering the direction of the axis X defined above and the plane P in which the bodies 40 of the various connecting devices lie.

According to the invention, the linking lug 42 of each combined connecting member 400a, 400b, 400c extends in a direction opposite the connection tongues so as to pass all the way through the insulating body 5 in the direction of the axis X defined above, and so that its free end 42o is located on the side of the insulating body 5 opposite the side on which the aforementioned plane P is located, that is to say, with reference to the orientations and directions defined above, the inner side 56 of the insulating body 5. As will be described in more detail below, the specific linking lug 42 of the combined connecting member can pass through the insulating body 5 at the level of a portion that laterally extends the accommodating housing 53 made in the insulating body in order to accommodate this combined connecting member, this portion also allowing the passage of a terminal 30 of the electronic power-supply and control module.

Figure 5:
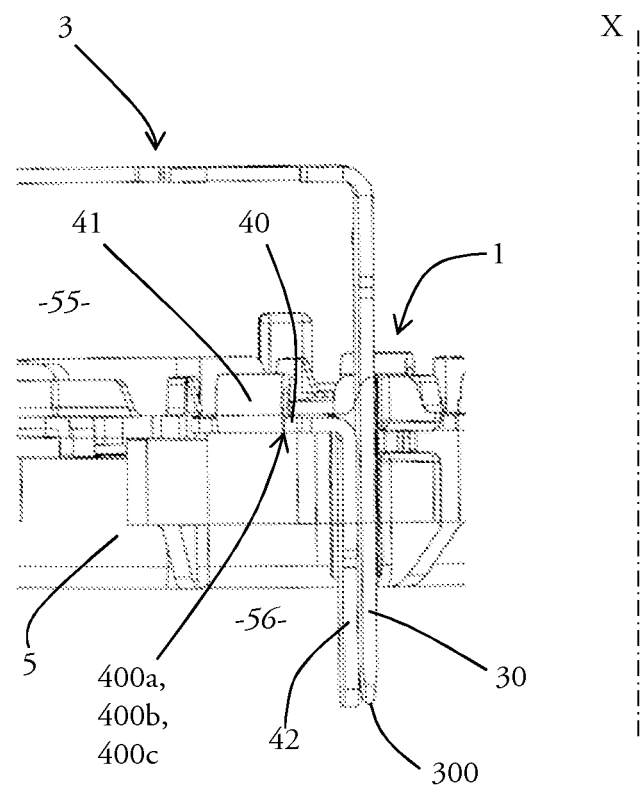
FIG. 5 is a schematic sectional view of a portion of a rotary electric machine such as that illustrated by FIGS. 1 and 2, in the region of a combined connecting member of the interconnection device according to the invention.

This is more particularly illustrated by FIG. 5, which is a schematic view of a portion of the interconnection device 1 in cross section along a plane parallel to the axis X thereof. More precisely, FIG. 5 is a cross section of the interconnection device 1 in the region of a combined connecting member 400a, 400b, 400c, thereof. FIG. 5 shows the insulating body 5 schematically, as well as the body 40, the connection tongue 41 and the linking lug 42 of the combined connecting member 400a, 400b, 400c. FIG. 5 clearly shows that the linking lug 42 passes all the way through the insulating body 5 in the direction of the axis X defined above and extends such that its free end 42o, that is to say the end opposite the body 40 of the connecting member, is arranged on the side of the insulating body opposite the side on which the connection tongue 41 extends.

More precisely, the invention make provision for the linking lug 42 to emerge, opposite the side of the insulating body 5 on which the connection tongue 41 extends, by a length, measured in the direction of the axis X of the interconnection device 1, that is sufficient to allow cooperation, for example by soldering, of a free end 42o of the linking lug 42 with a connection terminal 30 from the electronic power-supply and control module 3 which also passes through the insulating body 5. In other words, with reference to the orientations and directions defined above, it is clearly apparent from FIG. 5 that the linking lug 42 of the combined connecting member 400a, 40b, 400c passes through the insulating body 5 from the aforementioned outer side 55 to the aforementioned inner side 56, and that it extends, from the inner side 56 of the insulating body 5, by a dimension, measured in the direction of the aforementioned axis X, that is sufficient to allow its free end 42o to form an electrical link with a free end 300 of a connection terminal 30 from the electronic power-supply and control module 3, which, as mentioned and as will be described in more detail below, is made to pass through the insulating body through a portion that laterally extends the accommodating housing 53 made in the insulating body in order to accommodate the corresponding combined connecting member.

Figure 8:
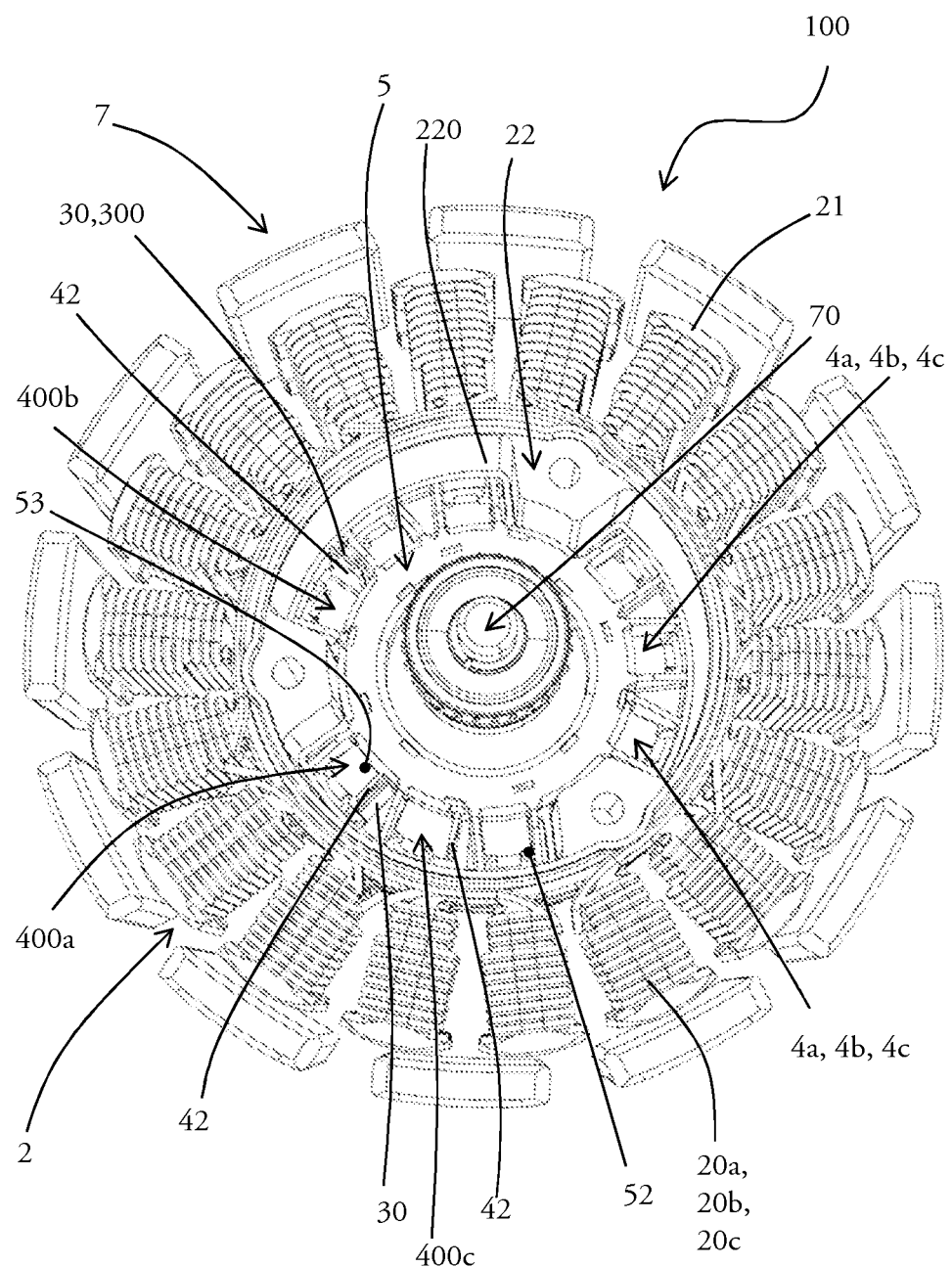
FIG. 8 is a schematic view of a portion of a rotary electric machine according to the invention such as that illustrated by FIGS. 1 and 2, the view here being that obtained from the side opposite that illustrated in FIG. 4.

FIG. 8 is a schematic view which shows, this time seen from the inner side 56 of the insulating body 5 of the interconnection device 1, the stator 2 and the associated winding, the rotary shaft 70 about which the rotor rotates, only the permanent magnets 71 of which are shown here.

In addition, FIG. 8 shows the coils 20a, 20b, 20c of the different phases of the stator 2, as well as the insulating body 5 of the interconnection device 1 and the connecting members 4a, 400a, 4b, 400b, 4c, 400c of the first group, of the second group and of the third group of connecting members. FIG. 8 also shows the free ends 300 of three connection terminals 30 from the electronic power-supply and control module 3, which are configured to cooperate with the free ends 420 of the linking lugs 42 of the combined connecting members 400a, 400b, 400c.

It should be noted that, according to the exemplary embodiment more particularly illustrated by FIG. 8, the linking lugs 42 of two of the combined connecting members, here the combined connecting members 400a and 400c of the second group and of the third group of connecting members, respectively, are not arranged from the same long side of the body 40 of the corresponding combined connecting member as the linking lug 42 of the combined connecting member 400b of the first group of connecting members. This allows in particular keying in the installation, in accommodating recesses 54a, 54b, 54c formed in the insulating body 5 of the interconnection device 1 and in particular visible in FIG. 6, of the coupling tracks 21a, 21b, 21c and connecting members 4a, 400a, 4b, 400b, 4c, 400c fixed to these coupling tracks, as shown by way of example in FIG. 7.

As shown in FIGS. 4, 8 and 9 for example, the aforementioned connecting members are, in the interconnection device 1 according to the invention, accommodated in accommodating housings arranged in the insulating body 5. More precisely, the invention makes provision for the simple connecting members 4a, 4b, 4c defined above to be accommodated in a first group of accommodating housings 52, and the combined connecting members 400a, 400b, 400c defined above to be accommodated in a second group of accommodating housings 53. It follows from the above that according to the invention, the accommodating housings 530f the second group of accommodating housings are configured to simultaneously accommodate the linking lug 42 of a combined connecting member 400a, 400b, 400c and a connection terminal 30 from the electronic power-supply and control module 3.

FIG. 9 shows more particularly the outer side of the insulating body 5 and a group of connecting members that is associated with one of the coupling tracks, here an outer coupling track 21c in that it consists of the coupling track furthest from the axis of rotation X. The group of connecting members comprises two simple connecting members 4c and one combined connecting member 400c. FIG. 9 also shows the coils 20b, 20C of the two groups of coils of the stator 2 that are coupled by the coupling track 21c, as well as the wires 25b, 25e from these coils and connected to the connection tongues 21 borne by the connecting members 4c, 400c in order to make this coupling.

As indicated above and as shown more precisely in FIG. 9, the insulating body 5 comprises a central portion 50 configured to be inserted substantially into a central portion 220, visible in FIG. 8, of the body 22 of the stator 2 with which it is coaxial, and a peripheral portion 51 which comes substantially into contact with the teeth 21, defined above, of the aforementioned body 22.

The central portion 50 of the insulating body 5 comprises, on its outer side illustrated by FIG. 7, a plurality of concentric annular recesses, which are centered on the axis X of the interconnection device 1 and are configured to accommodate the coupling tracks of the interconnection device 1. According to the embodiment more particularly illustrated here, and in particular visible in FIG. 6, the insulating body 5 comprises three annular recesses 54a, 54b, 54e, which are configured to accommodate the coupling tracks 21a, 21b, 21c defined above.

With reference to FIGS. 8 and 9, the housings 52 of the first group of accommodating housings, which are intended to accommodate the simple connecting members 4a, 4b, 4c defined above, are substantially rectangular in shape, the long sides of which are arranged in radial directions with respect to the axis X of the interconnection device 1 according to the invention and the short sides of which form portions of rings centered on the axis X of the interconnection device 1 according to the invention. Advantageously, the accommodating housings 52 of the first group of accommodating housings are all located at the same distance, measured radially with respect to the aforementioned axis X.

According to the invention, the dimensions, in a plane perpendicular to the aforementioned axis X, of an accommodating housing 52 of the first group of accommodating housings, are complementary to those of the body 40 of the connecting members 4a, 4b, 4c measured in the plane P defined above, so that the aforementioned body 40 can be accommodated in these accommodating housings and, more particularly, so that the body of the simple connecting members completely fills these accommodating housings 52 of the first group of accommodating housings. More precisely, each accommodating housing 52 of the first group of accommodating housings comprises two side walls which extend in radial directions with respect to the axis X of the interconnection device 1, and which extend in a direction substantially parallel to that of the axis X defined above, projecting from the outer side of the insulating body 5. The side walls thus form, on the one hand, guide walls for the insertion of the body 40 of the simple connecting members 4a, 4b, 4c into the aforementioned accommodating housings 52, as well as lateral retaining stops for the long sides of these bodies 40.

At their short side closest to the axis X of the interconnection device 1, the accommodating housings 52 of the first group of accommodating housings are delimited by a first end wall which forms a portion of a cylindrical wall centered on the axis X defined above, and which is configured to allow the positioning of a coupling lug 421 via which the simple connecting member 4a, 4b, 4c accommodated in the accommodating housing 52 in question is attached to the corresponding coupling track 21a, 21b, 21C.

At their short side furthest from the axis X of the interconnection device 1, the accommodating housings 52 of the first group of accommodating housings are delimited by a second end wall which forms a portion of a cylindrical wall centered on the axis X defined above, which is concentric with the first end wall defined above. The second end wall is configured to allow the positioning of the portion of the simple connecting member 4a, 4b, 4c and to allow the manipulation of the connection tongue 41 of this connecting member.

As is particularly visible in FIGS. 6 and 9, the accommodating housings 53 of the second group of accommodating housings, which are intended to accommodate a combined connecting member 400a, 400b, 400c, comprise a first portion 530 whose inner dimensions are substantially identical to those of an accommodating housing 52 of the first group of accommodating housings, and a second portion 531 that laterally enlarges the first portion 530 and is configured to simultaneously accommodate the linking lug 42 of a combined connecting member 400a, 400b, 400c and a connection terminal 3o, not shown in FIG. 9, from the electronic power-supply and control module 3.

According to the invention, at least the second portion 531 of the accommodating housing 53 passes all the way through the insulating body 5 in the direction of the axis X of the interconnection device 1 in order to allow the connection terminal and the linking lug to pass through the insulating body. According to the exemplary embodiment more particularly illustrated by FIGS. 6 and 9, the first portion 530 and the second portion 531 of the accommodating housing 53 pass all the way through the insulating body 5 in the direction of the aforementioned axis X, and the first portion 530 and the second portion 531 extend in the lateral continuation of one another, around the axis X defined above. In other words, first portion 530 and second portion 531 together form a single opening in the insulating body 5, passing all the way through the latter in the direction of the axis X defined above. This makes it possible to simplify the manufacture of the insulating body 5, for example by injecting a plastic material into a mold.

It follows from the above that the accommodating housings 530ƒ the second group of accommodating housings take the form of openings whose tangential dimension, measured around this axis X, is greater than the equivalent dimension, measured around the aforementioned axis X, of the accommodating housings 52 of the first group of accommodating housings.

It should be noted that, according to the exemplary embodiment more particularly illustrated by FIG. 9, the accommodating housings 52 of the first group of accommodating housings also pass all the way through, in the direction of the aforementioned axis X, the insulating body 5. This, although not necessary with regard to the interconnection between the stator 2 and the electronic control module 3 by the interconnection device 1, makes it possible, on the one hand, to simplify the manufacture, and therefore to decrease the cost price, of the insulating body 5, and allows, on the other hand, this element to be lightened.

The first portion 530 of an accommodating housing 53 is limited, around the axis X of the interconnection device 1, on the one hand, by a first side wall analogous to a side wall of an accommodating housing 52 of the first group of accommodating housings, defined above, and, on the other hand, by the second portion 531 of the accommodating housing 53 in question.

With reference to the above, the second portion 531 of an accommodating housing 53 is limited, around the axis X of the interconnection device 1, on the one hand, by the aforementioned first portion 530, and, on the other hand, by a second side wall 533.

As shown in FIGS. 6 and 9, the second side wall 533 is formed of a first portion 5330 analogous to the first side wall defined above which extends substantially radially, and a second portion 5331 which extends the first portion 5330 at its end closest to the axis X of the interconnection device 1, forming a cylinder portion centered on the aforementioned axis X. Measured tangentially around this axis X, the dimension of the aforementioned second portion 5331 is defined so that the free end of the latter forms a lateral stop for the body 40 of the combined connecting member 400a, 400b, 400c accommodated in the accommodating housing 53 in question, as shown in FIG. 9 for the combined connecting member 400c. More particularly, the second portion 5331 of the second side wall 533 forms a stop for the combined connecting member at the level of its linking lug 42.

It should be noted that, according to the exemplary embodiment more particularly illustrated by FIG. 9, the accommodating housings 530ƒ the second group of accommodating housings are not regularly distributed around the axis X defined above. In other words, the angle 600, measured around the aforementioned axis X, between the accommodating housing intended to accommodate the combined connecting member 400a of the first group of connecting members and the accommodating housing intended to accommodate the combined connecting member 400b of the second group of connecting members, is different from the angle 610, measured around the aforementioned axis X, between the accommodating housing intended to accommodate the combined connecting member 400b of the second group of connecting members and the accommodating housing intended to accommodate the combined connecting member 400c of the third group of connecting members, defined above. This makes it possible, on the one hand, to obtain keying in the positioning of the coupling tracks 21a, 21b, 21c within the insulating body 5 and, on the other hand, to optimize the bulk of the insulating body 5 with regard to the components of the electronic power-supply and control module 3 which is intended to be placed above the latter, with reference to the outer and inner designations defined above.

Advantageously, the locations and dimensions of the accommodating housings 52 of the first group of accommodating housings and of the accommodating housings 530ƒ the second group of accommodating housings are defined so that, when a coupling track 21a, 21b, 21c of the interconnection device 1 is inserted into the recess 54a, 54b, 54c configured in the insulating body in order to accommodate it, the simple 4a, 4b, 4c and combined 400a, 400b, 400c connecting members attached to this coupling track are naturally placed, respectively, in the accommodating housings 52 of the first group of accommodating housings and in the accommodating housings 530ƒ the second group of accommodating housings.

The invention, as it has just been described, achieves its set aims and makes it possible, using simple means, to produce a high-performance connection between a stator 2 of a rotary electric machine wo intended for a motor vehicle, and an electronic power-supply and control module 3 for this stator 2, without risk of losing sealtightness of a housing 31 in which the aforementioned electronic module is housed.

The invention is not limited to the means and configurations described and illustrated, however, and also applies to all equivalent means or configurations and to any combination of such means. In particular, while the invention has been described and illustrated here in the case of a three-phase stator, it applies to any type of stator 2 regardless of the number of phases that it comprises. Likewise, the invention applies to any geometry of a rotary electric machine 100 that has the elements and features described and illustrated in this document.

The invention claimed is:
1. An interconnection device for a rotary electric machine configured to provide an electrical connection between a stator comprising a plurality of coils and an electronic power-supply and control module, the interconnection device comprising:
an insulating body; and
a plurality of connecting members which are arranged on an outer side of the insulating body, each connecting member comprising a body configured to rest on the insulating body and a connection tongue for connecting to at least one coil,
wherein the plurality of connecting members comprises at least one combined connecting member which further includes a linking lug configured to electrically connect the at least one coil of the stator to the electronic power-supply and control module for the stator,
wherein the linking lug is sized such that the linking lug is configured to pass through the insulating body and a free end of the linking lug extends from an inner side of the insulating body; and
a connection terminal that is fixed to the linking lug such that the connection terminal passes through the insulating body and a free end of the connection terminal extends from the inner side of the insulating body.
2. The interconnection device as claimed in claim 1, wherein the at least one combined connecting member is configured such that the linking lug extends an edge of the body perpendicular to the edge bearing the connection tongue.

3. The interconnection device as claimed in claim 1, wherein the bodies of the connecting members are arranged together substantially in a same plane, the connection tongues all being located on a same side of this plane and the free ends of the linking lugs being arranged on an opposite side of this plane with respect to the connection tongues.

4. The interconnection device as claimed in claim 1, wherein the insulating body forms recesses for accommodating electrical coupling tracks for the plurality of coils, each coupling track forming a support for a group of connecting members, wherein each group of connecting members comprises the at least one combined connecting member.

5. The interconnection device as claimed in claim 4, wherein the coupling tracks are configured such that for one coupling track, a combined connecting member is arranged with at least one other connecting member on each side of this combined connecting member, and wherein in the one coupling track, the linking lug of the combined connecting member is laterally arranged on a first side of the body of this combined connecting member while in at least one other coupling track, the linking lug of the combined connecting member is laterally arranged on a second side of the body of this combined connecting member.

6. The interconnection device as claimed in claim 1, wherein the insulating body comprises accommodating housings that are each configured to accommodate a connecting member, wherein the accommodating housings are distributed in a first group of accommodating housings that are sized to accommodate simple connecting members without the linking lugs and in a second group of accommodating housings each comprising a first portion, dimensions of which are substantially identical to those of an accommodating housing of the first group of accommodating housings, and a second portion that laterally enlarges the first portion and is configured to simultaneously accommodate the linking lug of a combined connecting member and the connection terminal of the electronic power-supply and control module.

7. The interconnection device as claimed in claim 1 wherein the connecting members are angularly regular distributed around an axis of the insulating body of the interconnection device.

8. The rotary electric machine comprising a wound stator, the electronic power-supply and control module and the interconnection device as claimed in claim 1.

9. The rotary electric machine as claimed in claim 8, wherein the interconnection device is arranged between the stator and the electronic power-supply and control module, each combined connecting member being configured so that the connection tongue extends between the interconnection device and the electronic power-supply module to be connected to a coil of the stator and so that the linking lug passes through the insulating body of the interconnection device so that its free end is arranged opposite the electronic power-supply and control module with respect to the insulating body, the free end passing through the insulating body of the interconnection device.

10. The rotary electric machine as claimed in claim 8, for a cooling motor-fan unit in a motor vehicle.

\* \* \* \* \*